A. T. MORRIS.
Grapples.
No. 149,143. Patented March 31, 1874.
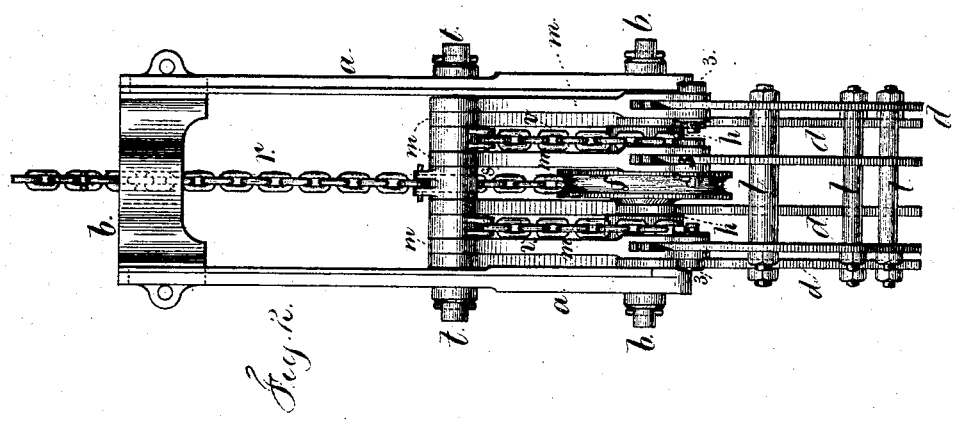
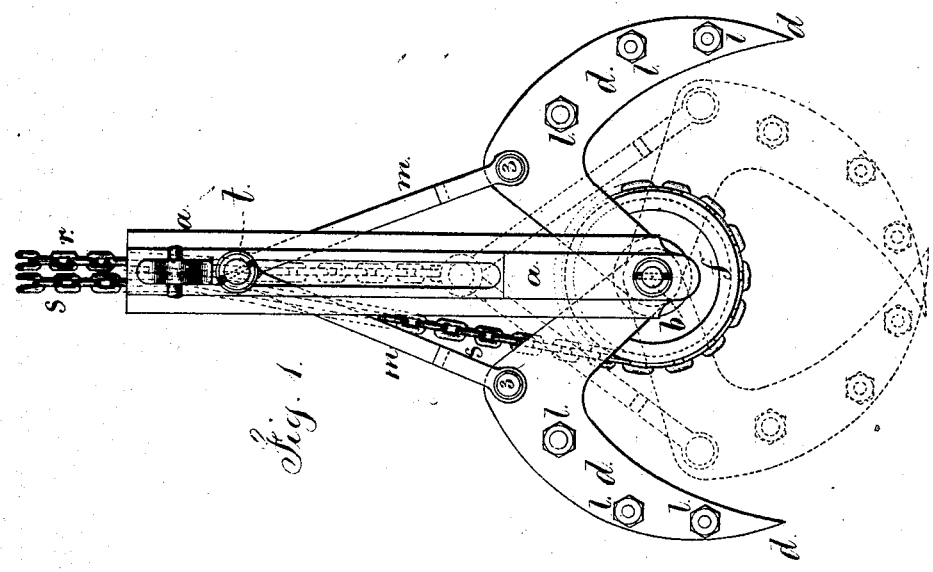
Witnesses
Chas H. Smith
Geo. T. Pinckney
Inventor
Augustus T. Morris
per Lemuel W. Serrell
atty.

UNITED STATES PATENT OFFICE.

AUGUSTUS T. MORRIS, OF BLOOMFIELD, NEW JERSEY, ASSIGNOR TO HIMSELF AND JAMES CUMMINGS, OF NEW YORK CITY.

IMPROVEMENT IN GRAPPLES.

Specification forming part of Letters Patent No. 149,143, dated March 31, 1874; application filed March 3, 1874.

*To all whom it may concern:*

Be it known that I, AUGUSTUS T. MORRIS, of Bloomfield, in the county of Essex and State of New Jersey, have invented an Improvement in Grapples, of which the following is a specification:

This device is for raising stones, rocks, and other articles from under water, or for pulling up piles or breaking to pieces or lifting sunken vessels, machinery, &c.

An apparatus has heretofore been made for the before-mentioned work, but it was not adapted to the severe duties that sometimes have to be performed.

My present invention consists in grappling-hooks hinged together upon one center main shaft, in combination with pairs of toggle-bars hinged together at a cross-bar, which is moved up and down bodily, and opens and closes the grapple, so that the grappling-hooks are supported and forced together in the most powerful manner, and to strengthen the grapple the hooks thereof are tied together by transverse bolts. The actuating-drum is also upon the main shaft, instead of being upon a separate shaft above the center of the grapple. Thereby the vertical space occupied by the apparatus is lessened, and the parts made stronger and more compact.

In the drawing, Figure 1 is an elevation of the said grapple as open—the dotted lines show the same closed—and Fig. 2 is a side view with the grapple closed.

The frames $a\ a$ are connected at the upper end by the cross-head $b$, that serves also as a guide for the chains passing through it. At the bottom the frames $a$ are connected by a strong shaft, $b$, that connects together the upper ends of the grapple-teeth $d\ d$, and on which shaft they swing freely. Upon the shaft $b$ the chain-wheel $f$ and chain-pulleys $h\ h$ are securely fastened. There are any desired number of these grapple-teeth. I have only shown three on each side, and they are connected together in sets by the cross-bolts or bars $l$ that pass through intervening cylinders or sleeves, that keep the teeth at the proper distance apart. At or near the bend or knee of each tooth a joint, 3, unites one end of a toggle-bar, $m$, and the other ends of these bars are united by a cross-bar, $t$, forming a center on which they swing, and this bar is guided at its ends in slots in the frames $a$, and is raised by drawing upon the chain $r$ to open the grapple, and to close the said grapples the chain $s$ is drawn upon. This chain $s$ performs the duty of closing the grapple by revolving the drum or pulley $f$ when pulled upon, and by the same revolving the shaft $b$ and pulleys $h$, and drawing down the cross-bar $t$ by the chains $v\ v$, and pressing the toggle-bars $m$ powerfully upon the knees of the hooks $d$, swinging the grappling-hooks toward each other, and the proportion of the parts is such that the grasping force will be greater than the weight to be raised, so that it will raise a rock, stone, or other article within the capacity and strength of the grapple, because the weight hangs upon the chain $s$, and that acts by leverage upon the grapples to force them together with a force due to the multiplied power of the weight itself that is raised.

In consequence of the irregularity of the article operated upon, the entire strain sometimes comes upon two or three teeth; but by employing a toggle-bar to each tooth, each tooth is firmly supported by its toggle independent of the adjacent teeth.

I claim as my invention—

The grappling-hooks hinged together at the cross-bar or shaft $b$, in combination with the toggle-bars connected together at the cross-bar $t$, and hinged to the grappling-hooks $d$, substantially as and for the purposes set forth.

Signed by me this 27th day of February, A. D. 1874.

A. T. MORRIS.

Witnesses:
 GEO. T. PINCKNEY,
 CHAS. H. SMITH.